United States Patent Office 3,446,641
Patented May 27, 1969

3,446,641
PIGMENT COMPOSITIONS
John Mitchell and Arthur Topham, Manchester, England, assignors to Imperial Chemical Industries Limited, London, England, a corporation of Great Britain
No Drawing. Filed Aug. 8, 1966, Ser. No. 570,721
Claims priority, application Great Britain, Aug. 16, 1965, 34,923/65
Int. Cl. C09b 67/00
U.S. Cl. 106—288                                13 Claims

ABSTRACT OF THE DISCLOSURE

Pigment compositions containing an organic pigment intimately mixed with an azo compound free from sulphonic acid or carboxylic acid groups. The azo compound has the formula $$A-N=N-B-Y-NR-Z-NR_1R_2$$

wherein A is an aromatic or heterocyclic group, B is an aromatic or heterocyclic group, Y is a carbonyl or sulphonyl group, Z is a divalent hydrocarbon group, R is hydrogen, alkyl or β-hydroxyethyl and $R_1$ and $R_2$ are each hydrogen, alkyl, β-hydroxyethyl or the atoms necessary together with the nitrogen atom to form a heterocyclic ring.

---

This invention relates to pigment compositions of improved strength and flow properties.

It has been found that the addition to organic pigments of certain azo compounds containing basic groups affords pigment compositions of improved tinctorial strength and flow properties compared with the untreated organic pigments and which have a reduced tendency to flocculation in ink or paint media.

According to the invention therefore there are provided pigment compositions containing an organic pigment intimately mixed with an azo compound free from sulphonic acid or carboxylic acid groups of the formula $A-N=N-B-Y-NR-Z-NR_1R_2$ wherein A is an optionally substituted aromatic or heterocyclic group, B is an optionally substituted aromatic or heterocyclic group, Y is a carbonyl or sulphonyl group, Z is a divalent hydrocarbon group which may be optionally substituted, R is a hydrogen atom or an optionally substituted hydrocarbon radical and $R_1$ and $R_2$ are each hydrogen atoms or optionally substituted hydrocarbon radicals or together with the nitrogen atom form a heterocyclic ring.

As examples of groups represented by A there may be mentioned for example carbocyclic aromatic groups such as benzene or naphthalene or heterocyclic groups such as pyrazolone or quinoline, which may be optionally substituted by for example alkyl groups such as methyl, hydroxyl groups, halogen groups such as chloro or bromo, nitro, methoxy, or trifluoromethyl, or a group $Y-NR-Z-NR_1R_2$ wherein Y, Z, R, $R_1$ and $R_2$ have the significance given earlier. To facilitate manufacture it is preferred that A should be a group such that either the derived amine of the formula $A.NH_2$, wherein the amino group occupies the position to be filled in the azo compound by the azo group, is an amine capable of diazotisation and coupling or the derived compound of the formula AH, wherein the specified hydrogen atom occupies the position to be filled in the azo compound by the azo group, is a compound capable of coupling with a diazonium compound. Amines useful in the manufacture of azo compounds useful in the invention include 5-nitro-2-amino-toluene, 5-chloro-2-aminotoluene, methyl anthranilate, sulphanilamide, p-dodecylaniline, 2,5-dichloroaniline, 1,5-diaminoanthraquinone, 4,4'-diaminodiphenylmethane and diaminodiphenylsulphone. In the case of the diamino compounds both amino groups may be diazotised and coupled with coupling components of the formula $BH-Y-NR-Z-NR_1R_2$. Compounds of the formula AH similarly useful include acetoacetanilide, acetoacet-o-toluidide, acetoacet-4-chloro-2,5-dimethoxyanilide, 2-naphthol, 2,3-hydroxynaphthanisidide, 1-phenyl-3-methyl-5-pyrazolone.

The groups represented by B are the same as those which may be represented by A except in that B may have one less free position since it must carry, in addition to any optional substituents, the group $$Y-NR-Z-NR_1R_2$$

The compound $B(-Y-NR-Z-NR_1R_2).NH_2$ also should preferably be a diazotisable amine or the compound $B(-Y-NR-Z-NR_1R_2).H$ a coupling component and examples of such for use in the invention include as amines p-aminobenzdimethylaminopropylamide and, as coupling components, salicyloctadecylaminopropylamide and 3-hydroxy-2-naphthdimethylaminopropylamide.

As examples of optionally substituted divalent hydrocarbon groups represented by Z there may be mentioned alkylene groups such as ethylene, 1,2-propylene, and especially trimethylene.

As examples of optionally substituted hydrocarbon radicals which may be represented by R, $R_1$ and $R_2$ there may be mentioned methyl, dodecyl, β-hydroxyethyl and octadecyl. R is preferably a hydrogen atom.

As examples of heterocyclic rings which may be formed by the groups $R_1$ and $R_2$ together with the nitrogen atom there may be mentioned morpholine, piperidine, pyrrolidine and hexamethyleneimine.

The azo compounds of the invention are in general coloured compounds ranging in colour from yellow to bluish-red and it is preferred to use them in conjunction with organic pigments which are of substantially the same colour.

As organic pigments to be used in the compositions of the invention there may be mentioned for example phthalocyanine, quinacridone, anthraquinone, and particularly azo pigments, such as 4-nitro-o-toluidine→2:3-hydroxynaphthtoluidide.

The azo compounds used in the pigment compositions of the invention may be made by any conventional procedure. For example an amine $ANH_2$ may be diazotised and coupled with a coupling component $$BH-Y-NR-Z-NR_1R_2$$

or an amine $NH_2-B-Y-NR-Z-R_1R_2$ may be diazotised and coupled with a coupling component AH.

The azo compounds may be intimately mixed with the organic pigment in any conventional manner. The organic pigment and the azo compound may for example be mixed and then milled together. In those cases where the organic pigment is an azo pigment and has a diazo or coupling component in common with the azo compound it is convenient to prepare the pigment and azo compound in admixture by coupling the common component with an appropriate mixture of the other components.

The azo compound may be present in proportions from 1% to 50% and preferably from 5 to 10% of the organic pigment.

The pigment compositions of the invention may be used for colouring inks such as gravure inks, viscous printing inks, and paints, by conventional methods. They may be for example ball-milled into a toluene solution of a zinc/calcium rosinate, triple-roll milled into a heat-bodied linseed oil or a solution of an alkyd resin in a high boiling petroleum distillate, or sand milled into a solution of an alkyd resin in white spirit.

Inks or paints prepared from these pigment compositions are of higher tinctorial strength and have better flow properties than those prepared from the organic pigments without the azo compounds. The inks or paints also have a lower tendency to flocculate.

The invention is illustrated but not limited by the following examples in which all parts and percentages are by weight unless otherwise stated.

EXAMPLE 1

15.2 parts of 5-nitro-2-aminotoluene are diazotised in 100 parts of water and 22 parts of 10 N hydrochloric acid solution by the addition of 50 parts of 2 N sodium nitrite solution at a temperature between 0 and 2° C. The resulting solution is filtered and diluted with water to 500 parts at a temperature between 0 and 2° C.

24.9 parts of 2,3-hydroxynaphth-o-toluidide are dissolved at 60° C. in a solution of 18 parts of 10 N caustic soda solution and 3.6 parts of a 10% aqueous solution of Turkey Red Oil in 175 parts of water. The solution is filtered and diluted with water to 450 parts at 20° C. The arylamide is reprecipitated by the rapid addition of 30 parts of 4 N acetic acid, and a solution of 1.35 parts of 3-hydroxy-2-naphthdimethylaminopropylamide in 5 parts of 4 N acetic acid is added. The temperature is raised to 50° C. and the diazo solution is added over about 3 hours, the rate of addition being such that an excess of diazo compound is avoided. The pigment is filtered from the slurry after making alkaline with caustic soda solution, washed free from electrolyte and dried at 60° C.

The product is a red powder which when incorporated by conventional milling procedures into gravure ink or paint media shows much increased strength, and has superior flow in general printing ink or paint formulations compared with a pigment made without the additive.

The 3 - hydroxy - 2-naphthdimethylaminopropylamide used above is prepared as follows:

A mixture of 89.1 parts of 3-dimethylaminopropylamine and 150 parts of methyl 3-hydroxy-2-naphthoate are stirred at a temperature between 90 and 100° C. After about 15 minutes methanol distils off and the product comes out of solution. At this stage 395 parts of acetone are added and the mixture cooled. The product is filtered off and washed with 158 parts of cold acetone to give 146 parts of the amide melting over the temperature range 157–158° C.

EXAMPLE 2

A suspension of 2,3-hydroxynaphth-o-toluidide is prepared as described in Example 1 and coupled at 50° C. with the diazo compound from 5-nitro-2-aminotoluene. When the coupling is complete a solution of 1.35 parts of 3-hydroxy-2-naphthdimethylaminopropylamide in 5 parts of 4 N acetice acid is added and this is coupled with the remaining diazo solution. The suspension is neutralised with caustic soda solution.

The isolated product when dry is similar to that from Example 1.

EXAMPLE 3

15.2 parts of 5-nitro-2-aminotoluene are diazotised in the manner described in Example 1. The solution is added over 1 hour to a solution of 27.2 parts of 3-hydroxy-2-naphthdimethylaminopropylamide in 30 parts of 4 N acetic acid, 250 parts of water and 100 parts of sodium acetate crystals. The dyestuff forms as a gel which forms a precipitate on being made alkaline with caustic soda and raising the temperature to 80° C. The precipitate is filtered off, washed free from electrolyte and dried at 60° C.

The product is a dark red powder, soluble in aqueous acetic acid and in organic solvents. When blended by dry mixing with Colour Index Pigment Red 12 in proportions of from 2–20% printing inks can be made from the resulting compositions having improved tinctorial strength and flow properties.

EXAMPLE 4

10 parts of the product from Example 3 are dissolved in aqueous acetic acid and the solution is added to a suspension of 100 parts of Colour Index Pigment Red 12 in water. Addition of aqueous caustic soda precipitates the additive on the surface of the pigment, which is then isolated in the usual manner.

The treated pigment shows the same advantages in printing ink media over an untreated control as the previous examples.

EXAMPLE 5

The 5-nitro-2-aminotoluene used in Example 3 is replaced by 26.1 parts of dodecylaniline. The product is isolated at 45° C. to avoid melting the product. Drying is also carried out at a lower temperature.

The product is blended with Colour Index Pigment Red 12 in proportions from 2 to 20% to give pigments of improved tinctorial strength and flow in printing ink media.

EXAMPLE 6

10.8 parts of 4,4'-diaminodiphenylsulphone are tetrazotised in the manner described in Example 1. The solution is added over 1 hour to a solution of 27.2 parts of 3-hydroxy-2-naphthdimethylaminopropylamide in 40 parts of 4 N acetic acid 40 parts of sodium acetate and 350 parts of water. The solution is made alkaline by the addition of caustic soda solution. The product is filtered off, washed free of electrolyte and dried at 60° C.

1 part of the dried product obtained as described above is dissolved in 10 parts of acetic acid and added to 10 parts of Colour Index Pigment Red 12 suspended in 200 parts of water. The suspension is heated to 80° C. and made alkaline by addition of caustic soda solution. The product is filtered off, washed free of electrolyte and dried at 60° C.

The viscosity of a printing ink obtained by milling 1 part of the product with 3.2 parts of thin lithographic varnish is lower than that of a corresponding ink made from untreated Colour Index Pigment Red 12 over a wide range of rate of shear, as measured with a Ferranti-Shirley cone and plate viscometer at 25° C.

| | Viscosity | |
|---|---|---|
| Rate of shear (sec.$^{-1}$) | Treated pigment (poise) | Untreated pigment (poise) |
| 1 | 825 | 4,010 |
| 5 | 478 | 1,215 |
| 20 | 315 | 451 |
| 70 | 228 | 279 |

EXAMPLE 7

17.2 parts of sulphanilamide are diazotised in the manner described in Example 1. The solution is added to a suspension of 52.4 parts of salicyl-3-octadecylaminopropylamide in a solution of 40 parts of sodium acetate in 40 parts of 4 N acetic acid and 350 parts of water. The solution is made alkaline by the addition of caustic soda solution. The product is filtered off, washed free of electrolyte and dried at 60° C.

1 part of the dried product obtained as described above is precipitated on the surface of 10 parts of Colour Index Pigment Yellow 13 in the manner described in Example 6.

The viscosity of a printing ink obtained by milling 1 part of the product with 3.2 parts of thin lithographic varnish is lower than that of a corresponding ink made from untreated Colour Index Pigment Yellow 13 over a wide range of rates of shear, as measured by a Ferranti-Shirley cone-and-plate viscometer at 25° C.

| Rate of shear (sec.$^{-1}$) | Viscosity (poise) | |
|---|---|---|
| | Treated pigment | Untreated pigment |
| 1 | 2,565 | 7,510 |
| 5 | 992 | 2,217 |
| 20 | 499 | 866 |
| 70 | 316 | 444 |

The salicyl-3-octadecylaminopropylamide used above is prepared as follows:

186 parts of 3-octadecylaminopropylamine is stirred at a temperature between 90 and 100° C. whilst 76 parts of methyl salicylate is added. The reaction is completed by stirring for 16 hours at 90–100°. The product forms a soft wax on cooling.

EXAMPLE 8

The procedure of the first paragraph of Example 7 is repeated using 56 parts of 3-hydroxy-2-naphthoctadecylaminopropylamide instead of the salicyl-3-octadecylaminopropylamide.

1 part of the dried product obtained is precipitated on the surface of 10 parts of Colour Index Pigment Yellow 13 in the manner described in Example 6.

The viscosity of a printing ink made by milling 1 part of the product with 3.2 parts of thin lithographic varnish is lower than that of a corresponding ink made from untreated Colour Index Pigment Yellow 13 over a wide range of rates of shear as measured by a Ferranti-Shirley cone-and-plate viscometer at 25° C.

| Rate of shear (sec.$^{-1}$) | Viscosity (poise) | |
|---|---|---|
| | Treated pigment | Untreated pigment |
| 1 | 4,985 | 15,100 |
| 5 | 1,846 | 4,311 |
| 20 | 862 | 1,557 |
| 70 | 498 | 698 |

The 3-hydroxy-2-naphthoctadecylaminopropylamide used above is prepared as follows:

120 parts of 3-octadecylaminopropylamine is stirred at 50° C. whilst 60 parts of methyl 3-hydroxy-2-naphthoate is added. The reaction is completed by stirring for 16 hours at 90–100°, finally reducing the pressure to 20 mm. to complete removal of methanol. On cooling, the product formed a wax.

EXAMPLE 9

15.1 parts of methyl anthranilate are diazotised in the manner described in Example 1. The solution is added over 30 minutes to a suspension of 27.5 parts of 3-hydroxy-2-naphthdimethylaminopropylamide in a solution of 100 parts of sodium acetate in 50 parts of 4 N acetic acid and 1000 parts of water at 40° C. The product is precipitated from solution by the addition of caustic soda solution. The precipitate is filtered off, washed free of electrolyte and dried at 60° C.

1 part of the dried product obtained is precipitated on the surface of 10 parts of Colour Index Pigment Red 12 in the manner described in Example 6.

The viscosity of a printing ink obtained by milling 1 part of the product with 3.2 parts of thin lithographic varnish is lower than that of a corresponding ink made from untreated Colour Index Pigment Red 12 over a wide range of rates of shear, as measured with a Ferranti-Shirley cone-and-plate viscometer at 20° C.

| Rate of shear (sec.$^{-1}$) | Viscosity (poise) | |
|---|---|---|
| | Treated pigment | Untreated pigment |
| 1 | 2,015 | 4,315 |
| 5 | 650 | 1,274 |
| 20 | 302 | 497 |
| 70 | 193 | 255 |

EXAMPLE 10

21.1 parts of p-aminobenzdimethylaminopropylamide are diazotised in the manner described in Example 1. The solution is added to a suspension of 17.8 parts of acetoacetanilide in a solution of 40 parts of sodium acetate in 40 parts of 4 N acetic acid and 350 parts of water. The solution is made alkaline by the addition of caustic soda solution and the precipitated product is flocculated by the addition of sodium chloride. The precipitate is filtered off and dried at 60° C.

An ink made of 0.8 part of the dried product obtained as described above, 7.2 parts of Colour Index Pigment Red 12 and 26 parts of thin lithographic varnish has a viscosity of 2130 poises at a rate of shear of 1 sec.$^{-1}$ compared to 4010 poises of an ink made similarly from untreated Colour Index Pigment Red 12.

The p-aminobenzdimethylaminopropylamide used above is prepared as follows:

A mixture of 65 parts of methyl p-aminobenzoate and 48.5 parts of 3-dimethylaminopropylamine is stirred for 16 hours at 140° C. The product is a viscous liquid, readily soluble in water.

EXAMPLE 11

The procedure of the first paragraph of Example 10 is repeated but replacing the acetoacetanilide by 26.4 parts of 3-hydroxy-2-naphthanilide.

An ink made of 0.8 part of the dried product so obtained, 7.2 parts of Colour Index Pigment Red 12 and 26 parts of thin lithographic varnish has a viscosity of 2260 poises at a rate of shear of 1 sec.$^{-1}$ compared with 4010 poises of an ink made similarly from untreated Colour Index Pigment Red 12.

EXAMPLE 12

The procedure of the first paragraph of Example 10 is repeated replacing the p-aminobenzdimethylaminopropylamide by 25.7 parts of p-aminobenzenesulphondimethylaminopropylamide.

1 part of the dried product obtained is precipitated on the surface of 10 parts of Colour Index Pigment Red 12 in the manner described in Example 6.

The viscosity of a printing ink obtained by milling one part of the product with 3.2 parts of thin lithographic varnish, at a rate of shear of 1 sec.$^{-1}$ is 1172 poises compared to a viscosity of 2660 poises of a printing ink similarly prepared using untreated Colour Index Pigment Red 12.

EXAMPLE 13

10 parts of 4,4'-diaminodiphenylmethane are tetrazotised in the manner described in Example 1. The solution is added to a suspension of 27.2 parts of 3-hydroxy-2-naphthdimethylaminopropylamide in a solution of 40 parts of sodium acetate in 40 parts of 4 N acetic acid and 350 parts of water. The solution is made alkaline by addition of caustic soda solution and the product is filtered off and dried at 60° C.

1 part of the dried product obtained is precipitated on the surface of 10 parts of Colour Index Pigment Red 12 in the manner described in Example 6.

The viscosity of a printing ink obtained by milling one part of the product with 3.2 parts of thin lithographic varnish is lower than that of a corresponding ink made from untreated Colour Index Pigment Red 12 over a wide range of rates of shear, as measured on a Ferranti-Shirley cone-and-plate viscometer at 25° C.

| Rate of shear (sec.⁻¹) | Viscosity (poise) | |
|---|---|---|
| | Treated pigment | Untreated pigment |
| 1 | 2,320 | 3,900 |
| 5 | 713 | 969 |
| 20 | 302 | 473 |
| 70 | 174 | 256 |

EXAMPLE 14

26.1 parts of dodecylaniline are diazotised in the manner described in Example 1. The solution is added over 1 hour to a suspension of 22.2 parts of salicyldimethylaminopropylamide in a solution of 20 parts of sodium acetate in 20 parts of 4 N acetic acid and 200 parts of water at 35° C. The solution is made alkaline by the addition of caustic soda solution and heated to 40° C. The product is separated by decantation and dried under vacuum.

1 part of the dried product obtained is precipitated on the surface of Colour Index Pigment Yellow 13 in the manner described in Example 6.

The viscosity of a printing ink obtained by milling one part of the product with 3.2 parts of thin lithographic varnish is lower than that of a corresponding ink made from untreated Colour Index Pigment Yellow 13 over a wide range of rates of shear, as measured with a Ferranti-Shirley plate and cone viscometer at 25° C.

| Rate of shear (sec.⁻¹) | Viscosity (poise) | |
|---|---|---|
| | Treated pigment | Untreated pigment |
| 1 | 2,726 | 15,100 |
| 5 | 890 | 4,311 |
| 20 | 421 | 1,557 |
| 70 | 275 | 698 |

The salicyldimethylaminopropylamide used above is prepared as follows:

A mixture of 226 parts of methyl salicylate and 179 parts of 3-dimethylaminopropylamine is stirred for 16 hours at 90–100° C. The product is a viscous oil.

What we claim is:
1. Pigment compositions containing an organic pigment selected from the group consisting of phthalocyanine, quinacridone, anthraquinone, and azo pigments intimately mixed with an azo compound free from a member selected from the group consisting of sulphonic acid and carboxylic acid groups, said azo compound having the formula A—N=N—B—Y—NR—Z—NR₁R₂ wherein A is selected from the class consisting of aromatic and heterocyclic groups, B is selected from the class consisting of aromatic and heterocyclic groups, Y is selected from the class consisting of carbonyl and sulphonyl groups, Z is a divalent hydrocarbon group, R is selected from the class consisting of hydrogen, alkyl and β-hydroxyethyl, and R₁ and R₂ are selected from the class consisting of hydrogen, alkyl, β-hydroxyethyl and the atoms necessary together with the nitrogen atoms to form a heterocyclic ring, said azo compound being present in proportions from 1 to 50% by weight of the organic pigment.

2. Pigment compositions as claimed in claim 1 wherein the azo compound is present in proportions from 5 to 10% by weight of the organic pigment.

3. Pigment compositions as claimed in claim 1 wherein the organic pigment is an azo pigment.

4. Pigment compositions as claimed in claim 1 wherein A is a carbocyclic aromatic group.

5. Pigment compositions as claimed in claim 1 wherein A is a phenyl group.

6. Pigment compositions as claimed in claim 1 wherein B is a phenylene group.

7. Pigment compositions as claimed in claim 1 wherein B is a naphthylene group.

8. Pigment compositions as claimed in claim 1 wherein Z is a trimethylene group.

9. Pigment compositions as claimed in claim 1 wherein R₁ and R₂ are methyl groups.

10. An ink containing pigment compositions as claimed in claim 1.

11. A process for the preparation of pigment compositions containing an organic pigment selected from the group consisting of phthalocyanine, quinacridone, anthraquinone and azo pigments and an azo compound free from a member selected from the class consisting of sulphonic acid and carboxylic acid groups, said azo compound having the formula A—N=N—B—Y—NR—Z—NR₁R₂ wherein A is selected from the class consisting of aromatic and heterocyclic groups, B is selected from the class consisting of aromatic and heterocyclic groups, Y is selected from the class consisting of carbonyl and sulphonyl groups, Z is a divalent hydrocarbon group, R is selected from the class consisting of hydrogen, alkyl, and β-hydroxyethyl, and R₁ and R₂ are selected from the class consisting of hydrogen, alkyl, β-hydroxyethyl and the atoms necessary together with the nitrogen atom to form a heterocyclic ring comprising milling a mixture of said organic pigment with said azo compound, said azo compound being present in proportions from 1 to 50% by weight of the organic pigment.

12. A process for the preparation of pigment compositions containing an organic pigment and from 1 to 50% by weight of the organic pigment of an azo compound free from a member selected from the class consisting of sulphonic acid and carboxylic acid groups, said organic pigment being an azo pigment containing a diazonium component which diazonium component is derived from an amine of the formula ANH₂ wherein A is selected from the class consisting of aromatic and heterocyclic groups, comprising reacting in equivalent proportions a diazonium compound derived from the amine ANH₂ with a mixture of two coupling components, one of said coupling components being the coupling component necessary for preparation of the organic pigment and the other of said coupling components differing from said one coupling component and having the formula

BH—Y—NR—Z—NR₁R₂ wherein B is selected from the class consisting of aromatic and heterocyclic groups, Y is selected from the class consisting of carbonyl and sulphonyl groups, Z is a divalent hydrocarbon group, R is selected from the class consisting of hydrogen, alkyl and β-hydroxyethyl, and R₁ and R₂ are selected from the class consisting of hydrogen, alkyl, β-hydroxyethyl and the atoms necessary together with the nitrogen atom to form a heterocyclic ring, thereby forming an insoluble pigment composition, and recovering the resulting insoluble pigment composition.

13. A process for the preparation of pigment compositions containing an organic pigment and from 1 to 50% by weight of the organic pigment of an azo compound free from a member selected from the class consisting of sulphonic acid and carboxylic acid groups, said organic pigment being an azo pigment of which the coupling component is derived from a compound of the formula AH wherein A is selected from the class consisting of aromatic and heterocyclic groups comprising reacting with the coupling component AH an equivalent amount of a mixture of diazonium compounds from two amines, one of said amines being necessary for the preparation of the organic pigment and the other of said amines differing from said one amine and having the formula

B(—Y—NR—Z—NR₁R₂)NH₂ wherein B is selected from the class consisting of aromatic and heterocyclic groups, Y is selected from the class consisting of carbonyl and sulphonyl groups, Z is a divalent hydrocarbon group, R is selected from a class consisting of hydrogen, alkyl and β-hydroxyethyl, and $R_1$ and $R_2$ are selected from the class consisting of hydrogen, alkyl, β-hydroxyethyl and the atoms necessary together with the nitrogen atom to form a heterocyclic ring, thereby forming an insoluble pigment composition and separating the resulting insoluble pigment composition from the reaction mixture.

References Cited

UNITED STATES PATENTS 2,508,448   5/1950   Brizzolara.

JAMES E. POER, *Primary Examiner.*

U.S. Cl. X.R.

106—20